United States Patent [19]

Corona

[11] 4,255,046
[45] Mar. 10, 1981

[54] VARIABLE OUTPUT POWER SUPPLY FOR FLASH UNIT

[75] Inventor: Stephen C. Corona, Rochester, N.Y.

[73] Assignee: Xerox Corporation, Stamford, Conn.

[21] Appl. No.: 76,715

[22] Filed: Sep. 19, 1979

[51] Int. Cl.³ .................. G03B 27/72; H05B 41/36
[52] U.S. Cl. ........................... 355/68; 315/151;
315/241 P; 354/33
[58] Field of Search ............ 355/38, 68, 69, 83;
315/151, 241 P, 159, 241 R; 354/33

[56] References Cited

U.S. PATENT DOCUMENTS

| 3,585,442 | 6/1971 | Krusche et al. ............ 315/151 |
| 3,619,055 | 11/1971 | Archer et al. .............. 355/69 |
| 3,725,734 | 4/1973 | Schneider ................ 315/151 X |
| 3,758,817 | 9/1973 | Elliott ..................... 315/151 |
| 3,864,601 | 2/1975 | Schneider ................ 315/151 X |
| 3,871,761 | 3/1975 | Mabrouk .................. 355/11 |
| 3,947,117 | 3/1976 | Basu et al. ................ 355/68 |
| 3,998,547 | 12/1976 | Schroter et al. ........... 355/68 |
| 4,017,180 | 4/1979 | Yen et al. ................. 355/68 |
| 4,093,376 | 6/1978 | Rabindran et al. ......... 355/68 |

Primary Examiner—George H. Miller, Jr.
Assistant Examiner—W. J. Brady

[57] ABSTRACT

A power supply for providing energy to a flash lamp comprising a plurality of capacitors connected in parallel with their outputs connected to the flash lamp. The capacitors are sequentially discharged by circuitry which continually compares the accumulated exposure with a reference signal which represents the desired exposure level. When the desired exposure is sensed, an inhibit signal is sent to the power supply preventing additional capacitors from being discharged.

8 Claims, 3 Drawing Figures

4,255,046

VARIABLE OUTPUT POWER SUPPLY FOR FLASH UNIT

BACKGROUND

The present invention relates to a flash illumination system and more particularly to a flash lamp power supply which provides energy to the lamp in incremental amounts until a desired exposure level is reached.

When an object is reproduced, either photographically or elecrtrographically, by flash exposure of a light sensitive material, the density of the object (dark and light highlights) must be determined in some manner so that compensation can be made to the material being exposed to maintain uniformity. Prior art efforts to control exposure automatically are reflected in numerous publications. In photography applications, an automatic exposure control for an electronic flash unit may include a light meter and electronic circuitry which detects the instantaneous amount of light reflected from the scene to be photographed onto the light sensitive element of the light meter. The light meter contains circuitry which integrates the signal derived from the light detecting element. When the integrated signals reach a predetermined level corresponding to required film exposure the flash is extinguished.

The power to a flash unit is typically provided by charging a capacitor or series of capacitors to a desired voltage; the capacitor(s) are then discharged through the lamp and associated discharge circuitry creating the flash illumination.

Various ways are known to change exposure levels in response to changes in object density. In one method, the charging voltage applied to the lamp is readjusted in response to pre-sensing of object density. Another method relies on quenching the lamp when the desired exposure level is reached. This quenching can be accomplished with a commutating circuit which uses a series switch (SCR) which when opened, causes the lamp to extinguish. Alternatively, in a crowbar circuit, the SCR is connected in parallel with the lamp and, when closed, shunts current around the lamp. Using these circuits, a significant amount of energy must be used to accomplish the control. Also, the switch must be capable of fast turn-on, turn-off time, a characteristic that adds to the cost of the system. In co-pending application, USSN No. 077,232 filed on Sept. 19, 1979 assigned to the same assignee as the present invention, a variable output power supply is disclosed which uses circuitry which pre-senses, or computes during the flash interval, the precise amount of energy which must be supplied to the flash lamp to obtain the desired exposure level.

SUMMARY

The present invention is directed towards a power supply which provides rapid adjustment of the applied energy to a flash unit in an energy-efficient manner and without the need for pre-sensing circuitry. In one embodiment, the need for quenching the lamp is also eliminated. This improved power supply is realized by providing a capacitor means for sequentially discharging units of stored electrical energy through a flash lamp, means for detecting energy released during flash and generating a signal proportional to the time integral of said energy, means for comparing integrated energy with a reference representing desired exposure, and for generating an inhibit signal to said capacitor means when said desired exposure level is attained.

DRAWINGS

DESCRIPTION

The invention as described below is directed to a variable output power supply which powers the flash illumination unit in a full frame document copier. It should be understood however, that the present invention is applicable to other types of devices which utilize flash illumination of an object with subsequent exposure of a light sensitive material. This would include other types of copying systems, microfilm and microfiche reprographic machines, and cameras which require automatic and continuous exposure control in response to variations in the reflectivity of objects being photographed.

Figure 1:
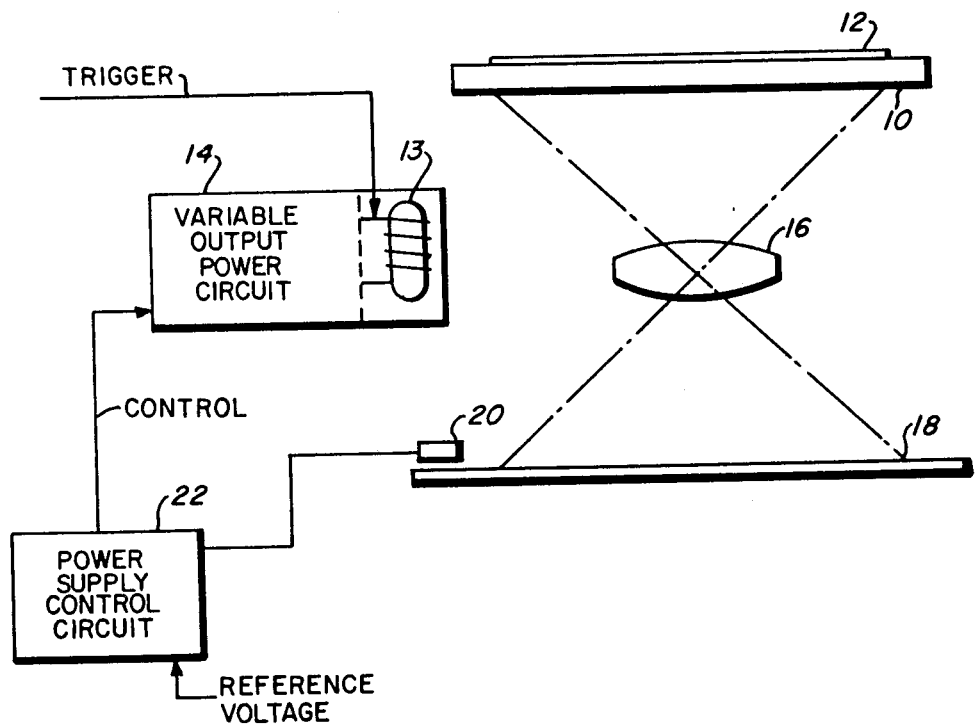
FIG. 1 is a block diagram of the present invention in a copier flash illumination environment.

Referring to FIG. 1, a platen 10 is provided which supports a document 12. A lamp 13 and variable output power supply 14 is adapted to provide illumination of the document. The reflected light from the document is projected through lens 16 onto photoconductor image plane 18.

A photodetector 20 senses the intensity of light which is incident on image plane 18. Although photodetector 20 is shown adjacent to image plane 18, the detector could be placed at various other locations above or below the lens with appropriate adjustments to the reference voltage (which represents the uniform image plane illumination desired).

Upon initiation of a print command, a trigger pulse energizes lamp 13 causing it to flash. An image of document 12 is projected through lens 16 selectively discharging portions of the photoconductive image plane 18 and forming a latent image of the document thereon. Photodetector 20 produces a continuous output signal which varies in accordance with impinging light i.e. with document exposure and sends this signal into power supply control circuit 22. This circuit produces a time integral output signal of the intensity of illumination sensed by the photodector and compares the signal with a predetermined reference voltage.

When the desired level is reached, circuit 22 generates a signal which prevents additional energy from variable output power circuit 14 from being added to the lamp and the lamp is therefore extinguished.

Figure 2:
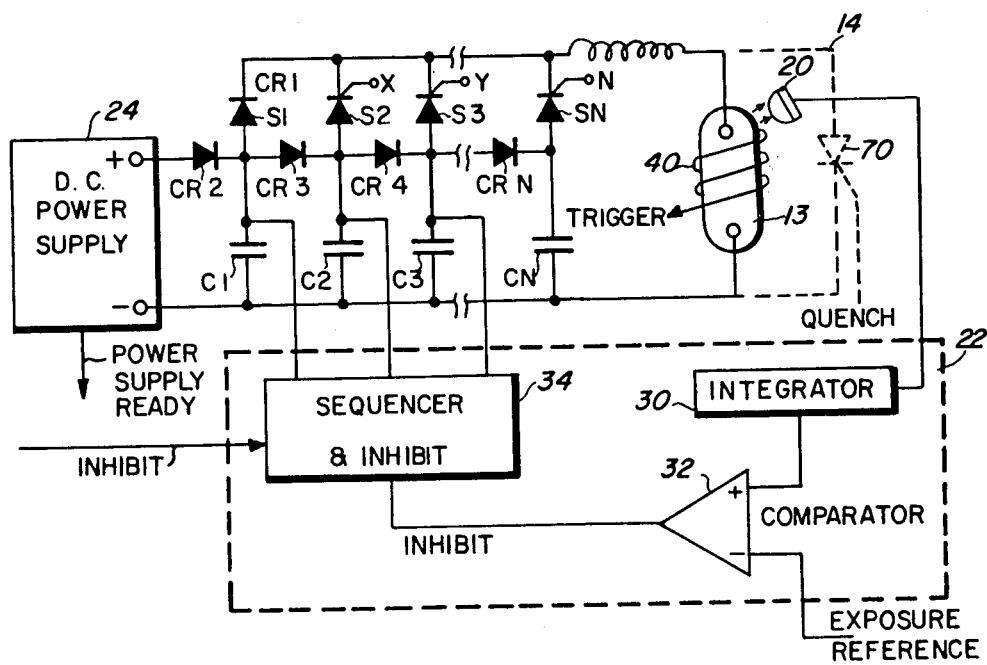
FIG. 2 is a block diagram of the variable output power supply and controlling circuitry according to the principles of the invention.
Figure 3:
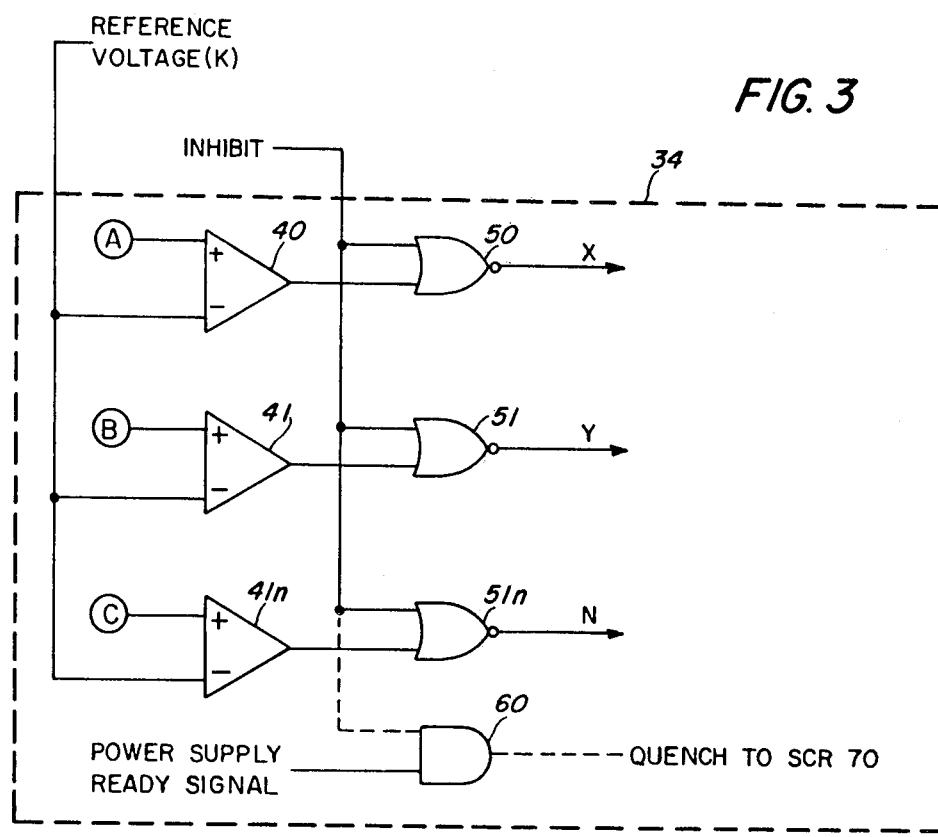
FIG. 3 is an electrical schematic of the sequencer and inhibit circuit shown in block diagram form in FIG. 2.

Referring now to FIGS. 2 and 3, variable output power supply 14 comprises a series of capacitors C1, C2, C3, CN connected in parallel. Associated with each capacitor are a series of SCR switches S2–SN which, when closed, connect the associated capacitor to lamp 13. The capacitors are initially charged from a conventional dc power supply source 24. Diodes CR1–CRN provide isolation from subsequent capacitors and the power supply and provide the charging path from power supply 24. Circuit 22 comprises an integrator 30 whose output is connected to comparator 32. The output of comparator 32 is connected to sequence and inhibit circuit 34 which generates signals used to control the capacitor bank in a manner to be described in greater detail below.

In operation, capacitors C1-CN are fully charged from supply 24. Capacitor C1, in a preferred embodiment, stores energy approximately equal to the minimun expected energy needed for exposure of the particular document. Switches S2-SN are open at the initiation of flash.

Upon receipt of the triggering voltage across external winding 40 of lamp 13, the gas within the lamp is ionized lowering its resistance and allowing the energy stored in capacitor C1 to be discharged through the lamp via diode CR1 producing a flash of light. Photodetector 20 generates an output signal I(t) which has a magnitude directly proportional to the intensity of the impinging light on the image plane. This signal is integrated by integrator 30 to produce a signal $$\int_o^t Idt$$

which is proportional to the accumulated energy emitted by the lamps. This signal is compared in comparator 32 to the reference signal representing the desired exposure level. If the integrated energy level is less than that required for desired exposure, comparator 32 does not generate an output. In sequencer and inhibit circuit 34, the voltage output level of capacitor C1 is monitored at point A, and compared to a reference signal (k) by comparator 40. The reference signal (k) is a voltage selected to correspond directly to a capacitor voltage slightly higher than the self-extinguishing voltage of lamp 13. When point A is less than reference signal (k) comparator 40 changes to a low or "0" state. The inhibit signal is normally "0" unless the desired exposure is reached (as more fully described below) thus causing NOR circuit 50 to change to a "1" or high state. The output of NOR gate 50 is applied to gate X of S2 changing S2 to the on state and allowing C2 to discharge into lamp 13. As the energy in C2 is dissipated in lamp 13 the voltage across C2 is also lowered. As in the previous case when the voltage on C2 is reduced to near the self-extinguishing voltage point of lamp 13, the voltage on point B (corresponding to that voltage) is lower than reference voltage (k), comparator 41 changes to the "0" state inputting a "0" to the two input NOR gate 51 if the inhibit signal is also "0". The output of NOR gate 51 will change to a "1" state allowing S3 to conduct. If at any time during this cycle the signal from integrator 30 into comparator 32 is greater than the exposure reference, corresponding to the desired exposure, comparator 32 will change to a high or "1" state. This inhibit signal is inputted into NOR gates 50-51N inhibiting these gates from changing to the "high" or 1 state which would allow additional capacitors to discharge into lamp 13. In addition if greater accuracy is required in a system with few sequential capacitors a crowbar circuit (described later) or a semi-conductor switch in series with lamp 13 (not shown) could be added to prevent the remaining energy in the last capacitor selected from discharging into lamp 13.

A crowbar circuit shown in dotted form in FIGS. 2 and 3 is described below. When the required exposure is reached comparator 32 changes to a high or (1) state providing an inhibit signal which prevents additional capacitors from being discharged into lamp 13. In addition this inhibit signal is inputted into an AND gate 60. If the DC power supply 24 is not in a charging state (which would normally be the case) the two "1"s are "ANDED" to provide a high signal to trigger crowbar SCR 70 shunting the remaining energy in the last capacitor around lamp 13 allowing it to extinguish. The power supply ready signal is added to prevent the simultaneous condition of SCR 70 being on and the DC power supply 24 supplying power to the circuit. For ease of explanation an example is given below.

A flash system is required to supply 20 to to 45 joules (±10% accuracy) to a flash lamp. The first capacitor C1 and the operating voltage is selected to provide the minimum required energy plus the allowed tolerance in this case 22 joules (20+10%). The number and energy storage capability of capacitors C2-CN are selected primarily on the basis of the resolution accuracy required of the system. The next capacitor would contain 10% of 22 joules or 2.2 joules, and the next capacitor 10% of (22+2.2) or 2.42 joules. This would continue until the energy sum of all the capacitor equaled the required maximum energy.

While the sequencer and inhibit circuit described above used a specific circuit shown in FIG. 3, other logic arrangements are possible consistent with the objects of the invention.

What is claimed is:

1. A flash illumination system comprising:
   a flash lamp for illuminating an object at an object plane;
   a variable output power supply connected to said flash lamp, said supply comprising a plurality of capacitors, each storing a discrete unit of electrical energy and a plurality of switches connected between an associated capacitor and the lamp;
   sensing and integrating means for generating a signal that varies in proportion to the light reflected from said object;
   a comparator for comparing said signal with a second reference signal representing a desired exposure level, said comparator generating an inhibit signal when said two signals are equal; and
   a sequence and inhibit circuit connected to the output of said comparator, said circuit including logic means for monitoring the voltage output level of each of said plurality of capacitors and for causing sequential discharge of each capacitor by enabling the associated switch upon determining a signal level at the capacitor slightly higher than the self-extinguishing voltage level of the lamp and the absence of an inhibit signal.

2. A flash illumination system according to claim 1 wherein said sensing and integrating means comprises a photosensor located so as to detect and generate a signal directly related to exposure at an image plane of said object, and an integrator which generates a time integral of said photosensor signal.

3. A flash illumination system according to claim 1 wherein a first capacitor is normally connected so as to discharge through said lamp at the time the lamp is triggered and wherein the remaining capacitors remain charged until caused to discharge by operation of said sequence and inhibit circuit.

4. A flash illumination system according to claim 3 wherein said first capacitor stores an amount of energy which is pre-determined to be approximately equal to the minimum expected energy required for exposure of the object.

5. The flash system of claim 4 wherein said first capacitor stores an amount of energy equal to the minimum required energy plus energy equal to the allowed exposure tolerance with each succeeding capacitor storing an amount of electrical equivalent energy equal to the expected exposure tolerance of the flash system.

6. A flash illumination system according to claim 1 further including a device connected in parallel with said lamp and the output of said comparator, said device being activated on generation of said inhibit signal and causing the charge remaining in the capacitor which was discharging at the time of inhibit signal generation to discharge said remaining charge through said device.

7. A flash illumination system comprising:
   a flash lamp for illuminating an object at an object plane;
   a variable output power supply connected to said flash lamp, said supply including a plurality of capacitors, each storing a discrete unit of electrical energy and a plurality of switches each connected between an associated capacitor and the lamp, a first capacitor being connected to said lamp through a closed switch with the remaining switches being normally open,
   a triggering circuit connected to said lamp for initiating flash discharge by causing said first capacitor to begin discharging through said lamp;
   a photosensor which detects the light reflected from said object at an image plane and which generates a signal directly related to object exposure at said image plane;
   an integrator connected to said photosensor which generates a time integral signal of the exposure-related signal;
   a comparator connected to said integrator for comparing said integrated signal with a reference signal representing a reference exposure voltage level, said comparator generating an inhibit signal when said reference and integrated signals reach the same level;
   a sequencing and inhibit circuit connected between said comparator and said power supply, said circuit including;
   means for monitoring the voltage level at the output of said first and remaining capacitors and for generating sequencing signals upon complete discharge of said first and subsequent capacitors, and in the absence of an inhibit signal from said comparator circuit;
   whereby only those capacitors are fully discharged which are required to reach the desired exposure level, the remaining capacitors remaining in their fully charged state.

8. The flash illumination system according to claim 7 further including a gating means connected in parallel with said lamp and adapted to be activted upon generation of said inhibit signal;
   whereby the capacitor undergoing instant discharge will short its remaining charge through said gating means effectively quenching said lamp.

* * * * *